J. WAHL.
PUMP COUPLING.
APPLICATION FILED NOV. 19, 1915.
1,244,925.
Patented Oct. 30, 1917.
Fig. 1.
Fig. 2.
Fig. 3.
Fig. 4.
Fig. 5.
Fig. 6.
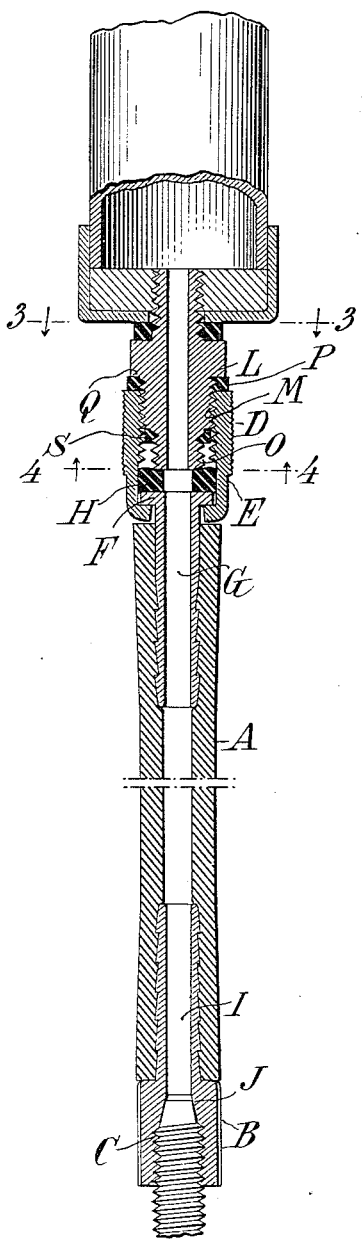
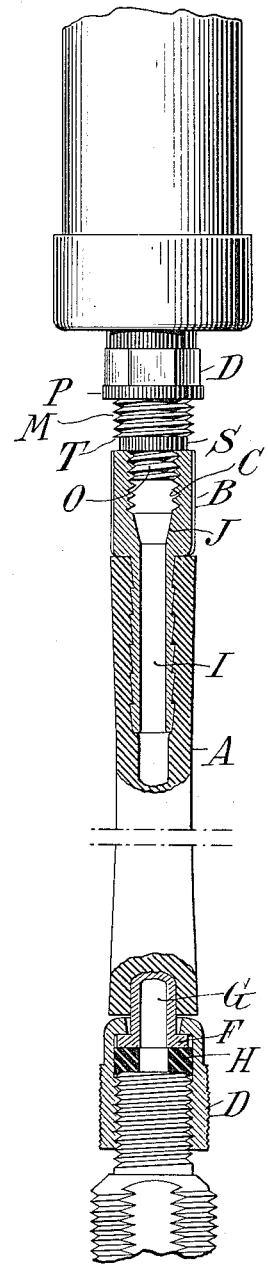
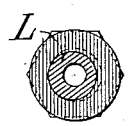
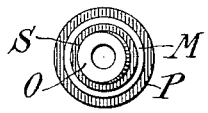
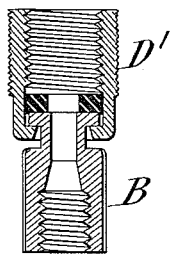
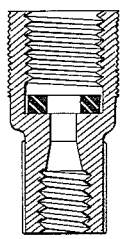
WITNESSES:
René Spruine
Ives White
INVENTOR
John Wahl,
By Attorneys,
Fraser, Furt & Munro

UNITED STATES PATENT OFFICE.

JOHN WAHL, OF BROOKLYN, NEW YORK, ASSIGNOR TO A. SCHRADER'S SON, INC., OF BROOKLYN, NEW YORK, A CORPORATION OF NEW YORK.

PUMP-COUPLING.

1,244,925.   Specification of Letters Patent.   Patented Oct. 30, 1917.

Application filed November 19, 1915. Serial No. 62,294.

*To all whom it may concern:*

Be it known that I, JOHN WAHL, a citizen of the United States of America, residing in borough of Brooklyn, county of Kings, city and State of New York, have invented certain new and useful Improvements in Pump-Couplings, of which the following is a specification.

This invention relates to pump couplings for tire valves or other similar purposes.

The object of the present invention is to provide a pump coupling which shall be capable of fitting valves of different diameters or threads. Preferably the structure of the invention is formed partly upon the pump itself, although this is not necessarily so. According to the preferred form of the invention the pump is provided with two nipples which correspond in diameter and thread to the different valves which the coupling is intended to fit. The pump tube is provided with a coupling member at each end, one of which is adapted to fit one valve and the other of which is adapted to fit the second valve. The invention also includes certain other features of improvement which will be hereinafter more fully described.

Referring to the drawings which illustrate one form of the invention,—

Figure 1 is a view of a lower part of a pump, showing the coupling in diametrical section.

Fig. 2 is a similar view with the pump tube reversed.

Fig. 3 is a section on the line 3—3 in Fig. 1.

Fig. 4 is a section on the line 4—4 in Fig. 1.

Figs. 5 and 6 are sectional views of modifications.

Referring to the drawings, let A indicate a pump tube which is usually of rubber, or other flexible fabric. According to the present invention the pump tube at one end is provided with a coupling member B which is formed with a screw-threaded bore C adapted to fit a valve having a given diameter. The opposite end of the tube is provided with a coupling D which is adapted to fit a valve of different diameter, in the case shown one of considerably larger diameter than that adopted to be engaged by the coupling B. Either or both of the couplings B and D may be constructed to swivel on the tube, in which case the construction illustrated at D may be used. In this construction the coupling has a sleeve or union E swiveled to a flange F formed on the member G, a packing H being carried within the union to make a tight joint with the top of the valve. If the swiveling feature is not desired, the construction of the coupling member B may be followed, in which case the coupling member is formed integral with the part I, and is provided with a tapered seat J designed to make contact with the valve nipple.

It will be observed that by turning the tube and coupling members end for end a leak-tight connection with several types of valve may be made.

Means are provided for connecting either end of the coupling tube to the source of air supply. Preferably in the case of pumps, such means are carried directly by the pump. In the construction shown the pump is provided for this purpose with a nipple L which has a screw-threaded portion M designed to receive the coupling member D, and a screw-threaded portion O designed to receive the coupling member B. When the coupling D is screwed on the pump, a tight joint may be made by the packing H which bears against the part O of the pump nipple. A packing P may also be introduced between the end of the coupling and a shoulder Q formed on the pump nipple. When the coupling B is screwed on the pump nipple a tight joint may be made by a packing S which is held against a shoulder T formed on the nipple. Or any other means may be provided to make a tight joint.

It is obvious that instead of the nipple being directly connected to the pump, it may be interposed at any place in the pipe line.

It is preferred that the nipple L shall have its two screw-threaded portions in axial alinement. It is also preferred that the two coupling members shall be connected to a short length of tube. In Fig. 5 is shown a construction, however, in which the two coupling members are connected together. In using this construction the nipple will be connected to the end of the pump tube. In this construction B' is the smaller coupling member and D' the larger coupling member, these being swiveled together as shown, although they may be constructed in one piece as illustrated in Fig. 6. Since the coupling members are usually adapted to screw on the outside of the pump connecting portion of the valve, it is preferred to construct the pump nipple or its equivalent with external threads, so that the coupling members may screw on it in like manner. The arrangement of threads may, however, be reversed if desired.

While I have shown and described several modifications of the invention, it will be understood that I do not wish to be limited thereto, since various changes may be made therein without departing from the spirit of the invention.

What I claim is:—

1. A coupling for pumps or the like, having two coupling members facing in opposite directions, said members being adapted for connection with tire valves having different pump connecting portions, in combination with a nipple adapted for connection with either of said coupling members.

2. A coupling for pumps or the like, having two different threads, in combination with a reversible coupling device having two coupling members each adapted to be connected with one of said threads.

3. A coupling for pumps or the like, comprising a nipple having two different external threads, in combination with a coupling device having two coupling members formed with internal threads, each of said members being adapted to screw onto one of the threads of said nipple.

4. A coupling for pumps or the like, comprising a tube having different coupling members at opposite ends, in combination with a nipple adapted to engage both said coupling members.

5. A coupling for pumps or the like, comprising a tube having different coupling members at opposite ends, in combination with a nipple having two screw-threaded portions in axial alinement, the nipple being adapted to engage both of said coupling members.

In witness whereof, I have hereunto signed my name in the presence of two subscribing witnesses.

JOHN WAHL.

Witnesses:
E. E. MYERS,
FRED WHITE.